(No Model.)
F. P. STONE.
FIFTH WHEEL FOR VEHICLES.
No. 308,860. Patented Dec. 2, 1884.
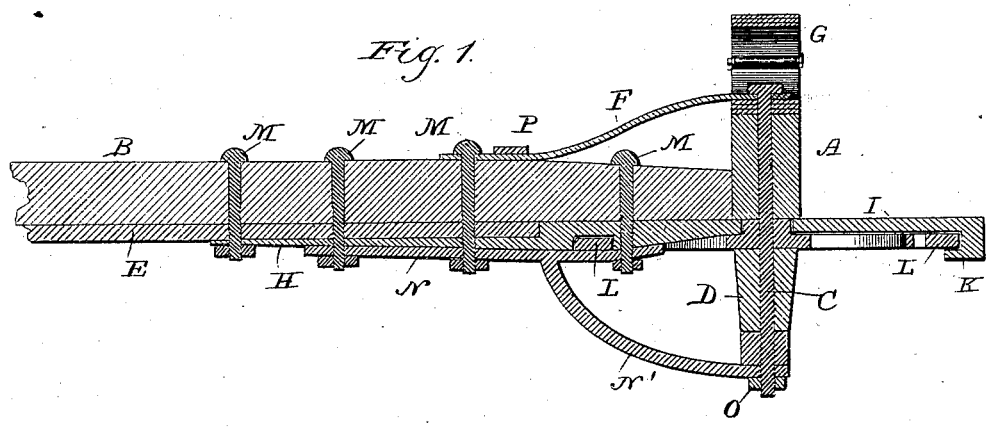
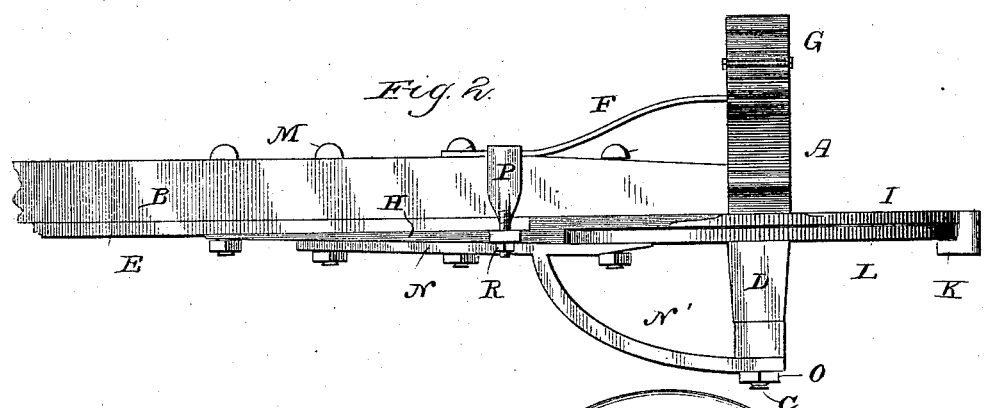
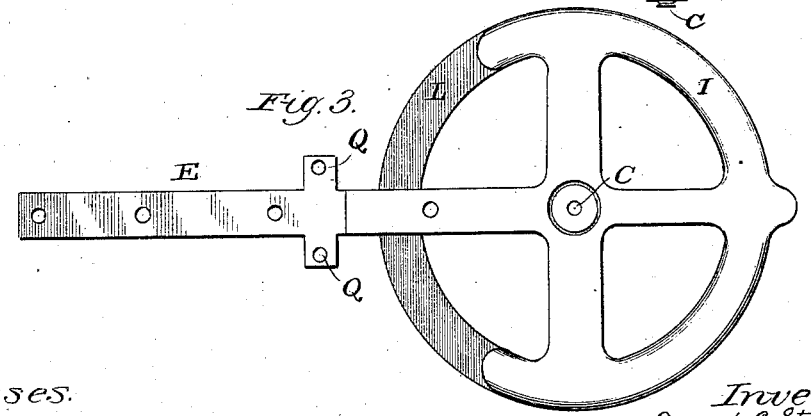
Witnesses.
Will R. Bushnidro
C. P. Elwell
Inventor
Frank P. Stone
By
Baldwin, Hopkins & Peyton Att'ys

UNITED STATES PATENT OFFICE.

FRANK P. STONE, OF CHICAGO, ILLINOIS.

FIFTH-WHEEL FOR VEHICLES.

SPECIFICATION forming part of Letters Patent No. 308,860, dated December 2, 1884.

Application filed April 4, 1884. (No model.)

*To all whom it may concern:*

Be it known that I, FRANK P. STONE, of Chicago, in the county of Cook and State of Illinois, have invented certain new and useful Improvements in Running-Gears for Vehicles, of which the following is a specification, reference being had to the accompanying drawings.

The general object of my improvements is to provide a structure which shall be strong, economical, durable, and readily repairable in case of necessity; but my improvements will be best understood from a detailed description of the parts and their relations, referring to the letters on the accompanying drawings, in which—

Figure 1 is a vertical section taken through the forward part of a reach, head-block, fifth-wheel, king-bolt, &c. Fig. 2 is a side elevation of the same, and Fig. 3 is a plan of a fifth-wheel and reach-plate detached.

A in the drawings indicates the head-block, to which the reach B is connected, and through which the king-bolt C passes, continuing down through the fifth-wheel mechanism and the axle D.

E indicates a reach-plate of metal for strengthening the reach, which does not, however, extend forward the entire length of the reach.

F indicates a brace plate or bar extending from the top of the reach up over the bottom portions of the springs G, and having an aperture to admit the king-bolt.

H indicates a re-enforce plate or reach-bar forming the forward continuation of the bar E, and formed in one piece with the upper fixed circular part, I, of the fifth-wheel, which has a flange, K, to form a recess or bearing for the movable circular part L of the fifth-wheel, that is secured to the front axle in any usual way. There may be more than one of these flanges K to form bearings for the movable part of the fifth-wheel, if desired. It will be observed that there is a recess in the bar H, forming a bearing or inclosure for the moving fifth-wheel.

M indicates bolts which pass through the reach and secure the various bars and plates in place, as indicated in the drawings.

N is a brace-plate extending forward of the fifth-wheel recess or bearing in the plate H, and with an arm, N', projecting below and embracing the bottom of the front axle or its metallic lining, and through which the king-bolt passes, and is secured by means of a nut, O.

P is a metallic clip straddling the reach and its attached plates and bars, with screw-threaded ends passing through the holes Q in the re-enforce bar H, where they are held by nuts R. This construction and relation of parts confine the movable part of the fifth-wheel, or the fifth-wheel proper, securely, so that only the minimum wear upon its bearing-surfaces will occur. The parts are made separate and detachable, so that it will be convenient to repair or replace them in case of necessity.

Having thus described the construction and relation of parts making up my invention, what I claim to be new, and desire to secure by Letters Patent of the United States, is—

1. The combination, with the reach, head-block, axle, and king-bolt, of the brace F, the reach-bar E, and the bar H, forming an extension thereof and integral with the fixed 75 part of the fifth-wheel I, bolted together and being substantially as described.

2. The combination, with the reach, head-block, axle, and king-bolt, of the reach-bar E, the bar H, forming an extension thereof and integral with the fixed part of the fifth-wheel, the fifth-wheel, and the plate N, with the brace N', substantially as set forth.

In testimony whereof I have hereunto subscribed my name.

FRANK P. STONE.

Witnesses:
S. R. HARRIS,
MARCUS S. HOPKINS.